United States Patent
Shamai et al.

(10) Patent No.: US 11,251,943 B2
(45) Date of Patent: Feb. 15, 2022

(54) SHARING A SECRET BETWEEN AN ISOLATED DEVICE AND A NETWORK CONNECTED DEVICE

(71) Applicant: GK8 LTD, Tel Aviv (IL)

(72) Inventors: Shahar Shamai, Rehovot (IL); Lior Lamesh, Rishon-LeZion (IL)

(73) Assignee: GK8 LTD, Tel Aviv (IL)

( * ) Notice: Subject to any disclaimer, the term of this patent is extended or adjusted under 35 U.S.C. 154(b) by 275 days.

(21) Appl. No.: 16/504,453

(22) Filed: Jul. 8, 2019

(65) Prior Publication Data

US 2021/0014045 A1 Jan. 14, 2021

(51) Int. Cl.
*H04L 9/08* (2006.01)
*H04L 9/14* (2006.01)
*H04L 29/06* (2006.01)

(52) U.S. Cl.
CPC ............ *H04L 9/085* (2013.01); *H04L 9/0863* (2013.01); *H04L 9/14* (2013.01); *H04L 63/0478* (2013.01); *H04L 63/0838* (2013.01)

(58) Field of Classification Search
CPC ......... H04L 9/085; H04L 9/0863; H04L 9/14; H04L 63/0478; H04L 63/0838

USPC ......................................................... 380/277
See application file for complete search history.

(56) References Cited

U.S. PATENT DOCUMENTS

| | | | |
|---|---|---|---|
| 9,589,397 B1* | 3/2017 | Christopher .......... | H04W 12/06 |
| 10,965,448 B1* | 3/2021 | Raman .................. | G06F 9/5061 |
| 2005/0076216 A1* | 4/2005 | Nyberg ................. | H04L 9/0844 |
| | | | 713/171 |
| 2018/0212762 A1* | 7/2018 | Peddada ................. | G06F 21/34 |
| 2020/0261673 A1* | 8/2020 | Hickey .................. | A61B 5/087 |
| 2020/0366653 A1* | 11/2020 | Caceres .............. | H04L 63/0853 |

* cited by examiner

*Primary Examiner* — Kambiz Zand
*Assistant Examiner* — Phuc Pham

(57) ABSTRACT

Methods, system and devices for sharing a secret between an isolated device connected to a network through a transmit-only unidirectional secure channel and a network connected user device, comprising generating a secret value divided to first and second components, transmitting the first component, via the unidirectional secure channel, to one or more computing nodes of a distributed system, and transferring the second component, via a tamper-resistant unidirectional insecure channel, to the network connected user device associated with the user to enable the network connected user device to reproduce the secret value by combining the first component received from one or more of the computing nodes with the second component.

20 Claims, 3 Drawing Sheets

SHARING A SECRET BETWEEN AN ISOLATED DEVICE AND A NETWORK CONNECTED DEVICE

BACKGROUND

The present invention, in some embodiments thereof, relates to sharing a secret between an isolated device and a network connected user device, and, more specifically, but not exclusively, to securely sharing a secret between an isolated device and a network connected user device via a transmit only unidirectional secure channel to the network and tamper-resistant unidirectional insecure channel to the network connected user device.

Sharing secrets between devices and systems may be desirable and in many cases essential for a plurality of applications ranging from secure data management and transfer to digital assets management and identity protection.

The challenges entailed in sharing secrets may be dramatically increased when the secret is shared between devices which are incapable of directly communicating with each other in a secure manner. Such insecure communication may be intercepted and exploited by potentially malicious parties attempting to gain access to sensitive and/or private information, digital assets (e.g. cryptocurrency) and/or the like.

SUMMARY

According to a first aspect of the present invention there is provided a method of sharing a secret between an isolated device connected to a network through a transmit-only unidirectional secure channel and a network connected user device, comprising using one or more processors of the isolated device associated with a user for:
  Generating a secret value divided to first and second components.
  Transmitting the first component, via the unidirectional secure channel, to one or more computing nodes of a distributed system.
  Transferring the second component, via a tamper-resistant unidirectional insecure channel, to the network connected user device associated with the user to enable the network connected user device to reproduce the secret value by combining the first component received from one or more of the computing nodes with the second component.

According to a second aspect of the present invention there is provided an isolated device, comprising a transmit-only first interface, adapted to transmit data via a unidirectional secure channel, a transmit only second interface adapted to transmit data via a tamper-resistant unidirectional insecure channel and one or more processors coupled to the first and second interfaces. One or more of the processor(s) are adapted to execute a code, the code comprising:
  Code instructions to generate a secret value divided to first and second components.
  Code instructions to transmit the first component, via the unidirectional secure channel, to one or more computing nodes of a distributed system.
  Code instructions to transfer the second component, via the tamper-resistant unidirectional insecure channel, to the network connected user device associated with the user to enable the network connected user device to reproduce the secret value by combining the first component received from one or more of the computing nodes with the second component.

In an optional implementation form of the first and/or second aspects, correct sharing of the secret value with the network connected user device is verified by analyzing a limited length string generated by the network connected user device based on the secret value.

In a further implementation form of the first and/or second aspects, the limited length string is received from the user operating a limited capacity input interface of the isolated device.

In an optional implementation form of the first and/or second aspects, the correct sharing of the secret value with the network connected user device is verified based on a challenge by:
  Transferring the challenge to the network connected user device via the unidirectional insecure channel.
  Receiving, from the user, a limited length string generated by the network connected user device based on the challenge and the secret value.
  Verifying correctness of the secret value by analyzing the received limited length string.

In a further implementation form of the first and/or second aspects, the distributed system comprises a plurality of computing nodes providing one or more services to the isolated device, the isolated device locally stores a plurality of encryption keys each of a respective one of a plurality of encryption-decryption key pairs each uniquely associated with a respective one of the plurality of computing nodes.

In a further implementation form of the first and/or second aspects, the unidirectional secure channel established with each of the one or more computing nodes is secured by encrypting communication transmitted from the isolated device using the encryption key of the respective encryption-decryption key pair uniquely associated with each of the computing node(s).

In a further implementation form of the first and/or second aspects, the unidirectional insecure channel is a display of the isolated device, transferring the second component to the network connected user device via the unidirectional insecure channel comprises projecting a visually encoded version of the second component via the display which is scanned by the network connected device.

In a further implementation form of the first and/or second aspects, the network connected user device receives the first component via a secure connection established with each of the one or more computing nodes by encrypting communication transmitted between the network connected user device and the one or more computing node using respective encryption keys of respective encryption-decryption key pairs uniquely associated with the network connected user device and with each of the computing node(s).

In a further implementation form of the first and/or second aspects, the isolated device transfers the respective encryption key of one or more of the computing nodes to the network connected user device via a tamper-resistant unidirectional insecure channel.

In an optional implementation form of the first and/or second aspects, the first component transmitted to one or more of the computing nodes is signed to enable the network connected user device to authenticate that the first component received from the one or more computing node genuinely originates from the isolated device.

In a further implementation form of the first and/or second aspects, a unique identifier associating the first component with the second component is transferred by the isolated device to each of the one or more computing nodes and to the network connected user device. The network connected user device uses the unique identifier to identify, to each of the computing node(s), the requested first component associated with the second component.

In a further implementation form of the first and/or second aspects, each of the one or more computing nodes provides the first component in response to a first request to obtain the first component and declines any successive request to obtain the first component.

In an optional implementation form of the first and/or second aspects, in case the network connected user device fails to obtain the first component due to a previous request for the first component received by one or more of the computing nodes. The network connected user device generates a failure indication. In response to the failure indication, the user informs the isolated device of the failure.

In an optional implementation form of the first and/or second aspects, a plurality of first components of the secret value is transmitted to a group of computing nodes of the distributed system. The network connected user device communicates with each computing node of the group to receive the plurality of first components. The network connected user device reproduces the secret value by combining the plurality of first components with the second component.

In an optional implementation form of the first and/or second aspects, the first component is split to a plurality of first components using one or more secret sharing algorithms applied according to one or more configuration parameters. The plurality of first components is transmitted to a group of computing nodes of the distributed system. The network connected user device reproduces the secret value by combining a subset of the plurality of first components with the second component. The subset of first components is received from a sufficient number of computing nodes defined by one or more of the configuration parameters.

In an optional implementation form of the first and/or second aspects, a plurality of first components is transmitted to a plurality of computing nodes of the distributed system. The network connected user device reproduces the secret value by combining a subset of the plurality of first components with the second component. The network connected user device generates a limited length string indicative of the subset. The a limited length string is provided to the isolated device to enable the isolated device to confirm validity of the first components received by the network connected user device from the subset of computing nodes.

In an optional implementation form of the first and/or second aspects, the secret value is shared with the network connected user device to create a One-Time Password (OTP) used by the user to access the isolated device.

In an optional implementation form of the first and/or second aspects, the secret value shared with the network connected user device is an encryption-decryption key pair uniquely associated with the network connected user device to associate the network connected user device with the isolated device and the user. The network connected user device uses the encryption-decryption key pair to securely communicate on behalf of the associated user with one or more of the computing nodes to which the decryption key of the encryption-decryption key pair is published.

In an optional implementation form of the first and/or second aspects, the secret value shared with the network connected user device is an encryption-decryption key pair uniquely associated with the network connected user device to associate the network connected user device with the isolated device and the user, the isolated device uses a decryption key of the encryption-decryption key pair to securely transmit data to the network connected user device, the isolated device securely transmits the data to the network connected user device via one or more of: the unidirectional secure channel and the tamper-resistant unidirectional insecure channel which is made secure by use of the encryption-decryption key pair.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DETAILED DESCRIPTION

Figure 1:
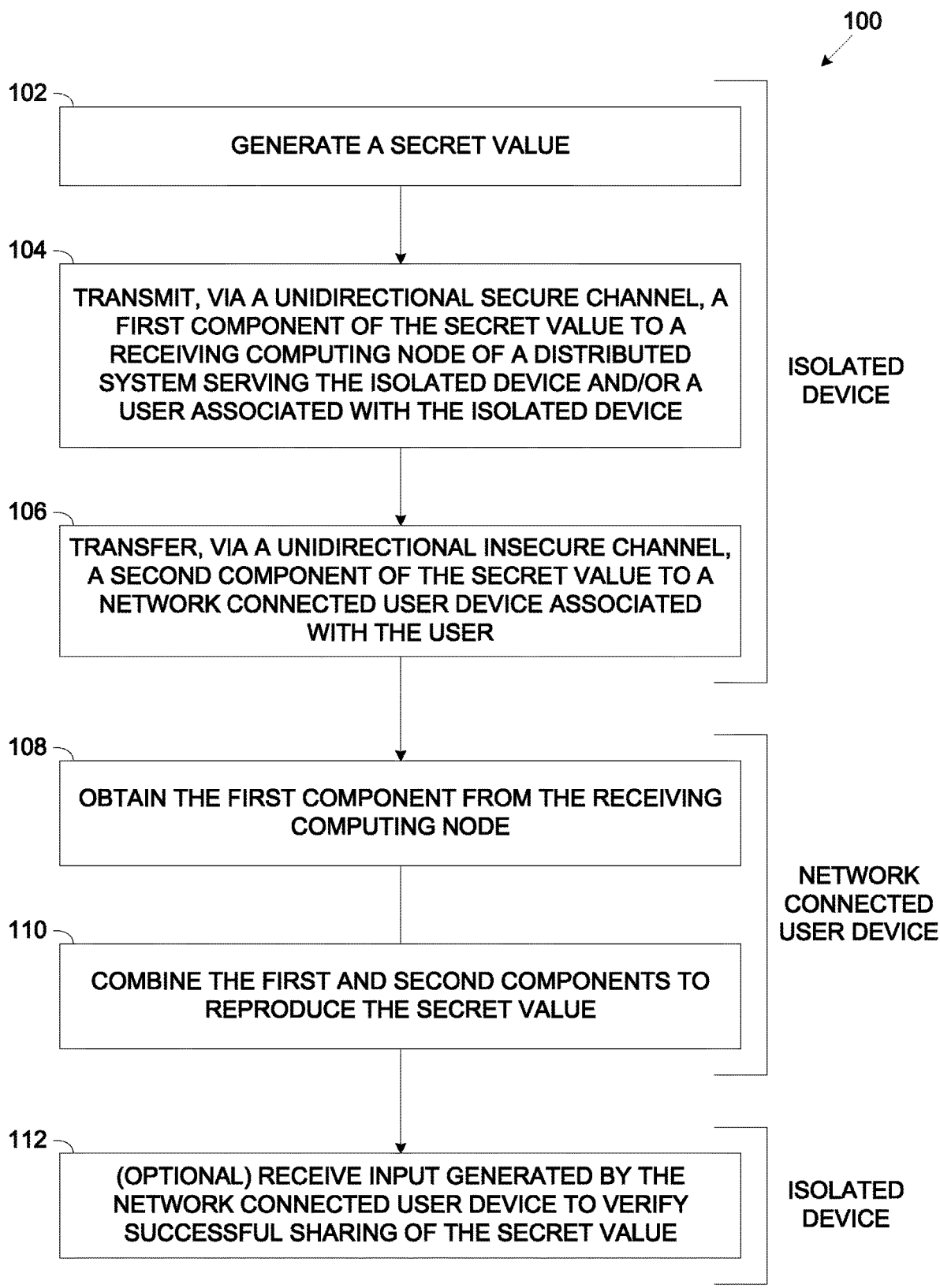
FIG. 1 is a flowchart of an exemplary process of sharing a secret between an isolated device and a network connected user device, according to some embodiments of the present invention.

The present invention, in some embodiments thereof, relates to sharing a secret between an isolated device and a network connected user device, and, more specifically, but not exclusively, to securely sharing a secret between an isolated device and a network connected user device via a transmit-only unidirectional secure channel to the network and tamper-resistant unidirectional insecure channel to the network connected user device.

According to some embodiments of the present invention, there are provided methods, systems and computer program products for sharing a secret between an isolated device having limited network connectivity via a transmit-only channel to the network and a network connected user device having full connection to the network.

The isolated device may transmit data to one or more network nodes connected to the network via a unidirectional secure channel established over the transmit-only channel. In particular, the isolated device may transmit data, via the unidirectional secure channel, to one or more of a plurality of computing nodes which form a distributed system providing one or more services to the isolated device and/or to a user associated with the isolated device. The isolated device is isolated from the network on the input path and includes a tamper-resistant transmit-only unidirectional (one-way) secure channel through which the isolated device may transmit data to the one or more of the computing nodes. As the secure channel is tamper-resistant data transmitted via this channel may not be altered either intentionally and/or accidently and is thus received at the target computing node as transmitted by the isolated device.

As it is highly isolated from any network, the isolated device may be highly robust and immune to network attacks initiated by malicious parties, specifically for compromising and/or gaining access and control over data stored in the isolated device. The isolated device may be therefore used as a secure device for storing sensitive, private and/or theft-prone data. For example, the isolated device may be used as a digital wallet, specifically a cold wallet for storing digital assets, for example, a cryptocurrency (e.g. Bitcoin, Ethereum, etc.). As such the distributed system may be, for example, a cryptocurrency network (community) maintaining a blockchain using one or more distributed ledger algorithms.

The isolated device may further include a limited capacity input interface used for receiving manually and/or automatically inserted limited data volumes, in particular limited length strings. Operating the limited capacity input interface, which may typically include a Human Machine Interface (HMI), for example a keyboard, a touchscreen, a touchpad and/or the like the user may insert data to the isolated device, for example, in the form of one or more limited length strings, digits and/or the like.

In order for the user to gain access to the service(s) provided by the distributed system using the data stored in the isolated device, the user needs to access the isolated device and may need to communicate with the distributed system. However, since maintaining high security of the isolated device is essential, access to the isolated device may be done using an access code, password and/or the like which is secret and known only to the user associated with the isolated device. Moreover, due to the limited connectivity of the isolated device to the network, i.e. no receive path, interacting with the distributed system via the isolated device by operating the limited capacity input interface, typically manually by the user, may be highly tedious, inefficient and error-prone for the user.

In order to facilitate for the user an easy and user friendly execution of one or more of a plurality of operations relating to the isolated device, the data stored in the isolated device and/or the service(s) provided by the distributed system, the user may use a network connected user device. The network connected user device, for example, a Smartphone, a tablet, a computer and/or the like which is also associated with the user has network connectivity and is therefore capable of connecting to the network for communicating with the distributed system.

As evident it may be highly desirable to harness the network connected user device for interacting with the distributed system and/or consuming, using and/or executing the services provided by the distributed system. However, in order to maintain the security and attack immunity of the isolated device and its stored data, it may be essential to verify that the network connected user device is indeed associated with the user and that data exchanged with the network connected user device is secure and immune to interception.

However, ensuring validity of the network connected user device and the security of the exchanged data may present a major challenge since communication between the isolated device and the network connected user device may be susceptible to eavesdropping by one or more malicious parties attempting to gain access to the isolated device by intercepting data exchange between the isolated device and the network connected user device and exploiting this intercepted data. This is due to the fact that communication between the isolated device and the network connected user device is based on the limited capacity input interface one or more unidirectional insecure channels available to the isolated device for transmitting data.

The unidirectional insecure channel(s) may be used by the isolated device to transmit (transferring) data to nearby devices, for example, the network connected user device located at the same site and in close proximity to the isolated device such that the user may operate both the isolated device and the network connected device. The unidirectional insecure channel(s), for example, a display, a screen, a projector, an audio output interface, a tactile interface, a printer and/or the like. While data transmitted (delivered) via the unidirectional insecure channel(s) is tamper-resistant, i.e. may not be altered either intentionally and/or accidently, the transferred data may be intercepted and/or exposed to one or more parties monitoring the unidirectional insecure channel(s). The unidirectional insecure channels may include, for example, a display and/or the like which may be operated by the isolated device to present one or more strings, QR codes, barcodes, patterns and/or the like which may be scanned by the network connected user device but may be also intercepted by one or more malicious devices (e.g. camera) and/or parties (e.g. person).

To overcome the susceptibility of the communication between the isolated device and the network connected user device to exploitation by the malicious party(s), the isolated device may share with the network connected user device a common secret which may be used to establish secure and traceable data exchange between the isolated device and the network connected user device and/or with one or more of the computing nodes of the distributed system.

Since directly sharing the secret with the network connected user device via the unidirectional insecure channel(s) may be prone to interception and eavesdropping by the malicious party(s), the isolated device may employ a split secret transfer scheme supported by the distributed system in order to securely share the secret with the network connected user device. The split secret transfer is based on dividing a secret to a plurality of components which are delivered separately to the distributed system via the unidirectional secure channel and to the network connected user device via the via the unidirectional insecure channel(s).

The isolated device may generate a secret, specifically a secret value and may divide (split) the secret value to a plurality of components which combined together allow reproduction of the secret value. In a simple implementation, the isolated device may divide the secret value to two components, specifically a first component and a second component. In this case the isolated device may distribute the first component to a single computing node of the distributed system which may be designated the receiving computing node. However according to some embodiments of the present invention as described in detail herein after, the isolated device may divide the first component of the secret value to a plurality of first components which may be distributed to a plurality of receiving computing nodes of the distributed system.

The isolated device may transmit one or more first components of the secret to one or more receiving computing nodes of the distributed system via the unidirectional secure channel. The unidirectional secure channel may be established with each of the computing nodes by encrypting data transmitted by the isolated device using one or more encryption algorithms. For example, each of the computing nodes of the distributed system may be associated with a unique encryption-decryption key pair (e.g. private and public keys) where the encryption key is published and the decryption key is private and known only to the respective computing node. The isolated device may securely transmit data to one or more of the computing nodes by encrypting the transmitted data using the encryption key of each of the respective computing node. Moreover, the isolated device may sign messages transmitted to the computing node(s) using an encryption-decryption key pair uniquely associated with the isolated device such that the computing node(s) may authenticate the isolated device as the origin of the transmitted data.

The isolated device may transmit the second component of the secret to the network connected user device via one or more of the tamper-resistant unidirectional insecure channels of the isolated device. The isolated device may further transmit to the network connected user device address(s) (e.g. a public key) of the computing node(s) to which the first component was transmitted.

The isolated device may also transmit to the computing node(s) and to the network connected user device an identifier of the secret sharing session which may be used to associate between the first component and a second component. This may be essential in systems where a plurality of isolated devices served by the distributed system may engage in secret sharing session with a plurality of respective network connected user devices.

The network connected user device may then communicate with the receiving computing node(s) to request and obtain the first component(s). In the request, the network connected user device may further include its own public key (i.e., the public key of the network connected user device) to establish a secure communication channel with the receiving computing node(s) in order to secure the exchanged data messages against malicious party(s) who may apply one or more attack vectors, for example, a man in the middle (MITM) to communicate with the computing node impersonating as the network connected user device in attempt to obtain the first component.

The secure channel between the network connected user device and the receiving computing node(s) may be established as known in the art. The network connected user device may encrypt its transmitted messages (data) using the public key of the receiving computing node(s) (received from the isolated device) and sign these transmitted messages using its own private key which may be verified by the receiving computing node(s) having the public key of the network connected user device. Complementary, the receiving computing node(s) may encrypt their transmitted messages using the public key of the network connected user device (received in the request) and sign these transmitted messages using its own private key which may be verified by the network connected user device having the public key of the receiving computing node(s).

After acquiring the first component, the network connected user device may combine the first component(s) and the second component to reproduce the secret value.

As stated herein before, the unidirectional insecure channel(s) of the isolated device may be monitored and/or exposed to the malicious party(s) who may intercept the data exchanged over the insecure channel, in particular, the second component of the secret value, the public key of the receiving computing node(s) and the unique identifier of the secret sharing session. The malicious party(s) may therefore communicate with the receiving computing node(s) and using the intercepted data the malicious party(s) may attempt to obtain the first component from the receiving computing node(s).

In order to prevent such exploitation by the malicious party(s), the computing nodes of the distributed system, in particular the receiving computing nodes which received the first components may be configured to respond only to a first request to obtain the first component(s) and decline any subsequent requests for each secret sharing session (identified by the unique session identifier). In case the first request for the first component is genuinely received from the network connected user device, the receiving computing node provides the first component to the network connected user device. In case the first request for the first component is received from a malicious party impersonating as the network connected user device, the receiving computing node may provide the first component to the malicious party. However, after the malicious party obtained the first request, when the network connected user device requests the first component, the receiving computing node declines the request of the network connected user device. At this point the receiving computing node may determine that the secret sharing session is compromised since two requests are detected instead of a single request expected from the network connected user device and may abort. Moreover, the receiving computing node may respond to the network connected user device with a failure indication to inform the network connected user device of the compromised secret sharing session.

Optionally, the receiving computing node 204 is configured to respond to the request for the first component within a predefined time period to limit the time duration of the secret sharing session thus reducing the time available for the malicious party(s) to launch an attack.

The secret shared between the isolated device and the network connected user device may be used for one or more of a plurality of applications and use cases.

For example, the isolated device may share the secret value with the network connected user device in order to generate a One Time Password (OTP) which may be used by the user for accessing the isolated device. This may be highly advantageous as the isolated device may store sensitive, private and/or theft-prone data to which access is restricted to only the user. Therefore by sharing the secret value with the network connected user device, it may be verified that the network connected user device is indeed associated with the user and may be trusted for generating the OTP.

In another example, the isolated device may share the secret value with the network connected user device in order to generate an encryption-decryption key pair (e.g. private/public keys) uniquely associated with the network connected user device. The isolated device may further publish the generated public key associated with the network connected user device. As such the isolated device publishes to the distributed system that the network connected user device is associated with the isolated device and may be trusted. The network connected user device may thus communicate with one or more of the computing nodes of the distributed system on behalf of the associated user. This may be highly beneficial since the user may be extremely limited in interacting with the distributed system through the isolated device which has only the limited capacity input interface. In contrast, the trusted network connected user device may be easily operated by the user to simply and effacingly interact with the distributed system.

In another example, the isolated device may share the secret value with the network connected user device in order to generate an encryption-decryption key pair (e.g. private/public keys) uniquely associated with the network connected user device. The isolated device may use the encryption-decryption key pair to securely transmit data to the network connected user device via the unidirectional secure channel and/or via the unidirectional insecure channel which is now made secure by use of the encryption-decryption key pair. Using the unidirectional secure channel to communicate over the network with the network connected user device 206 may present major advantages as the isolated device may need to transfer large amounts of data which to the network connected user device which may difficult and time and/or effort consuming using the unidirectional insecure channel (e.g. QR codes, barcodes, etc.).

The split secret sharing scheme which may be applied to achieve the advantages described herein before, may present high reliability and immunity to malicious attacks while require very limited and potentially no intervention by the user thus relieving the user from the tedious, time consuming, effort consuming and error prone task of operating the limited capacity input interface of the isolated device. User intervention is basically not mandatory and the user may be optionally requested to operate the limited capacity input interface of the isolated device only in cases of failure and/or in order to verify proper completion of the secret sharing session.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable storage medium can be a tangible device that can retain and store instructions for use by an instruction execution device. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Computer Program code comprising computer readable program instructions embodied on a computer readable medium may be transmitted using any appropriate medium, including but not limited to wireless, wire line, optical fiber cable, RF, etc., or any suitable combination of the foregoing.

The program code for carrying out operations for aspects of the present invention may be written in any combination of one or more programming languages, including an object oriented programming language such as Java, Smalltalk, C++ or the like and conventional procedural programming languages, such as the "C" programming language or similar programming languages.

The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). The program code can be downloaded to respective computing/processing devices from a computer readable storage medium or to an external computer or external storage device via a network, for example, the Internet, a local area network, a wide area network and/or a wireless network.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Referring now to the drawings, FIG. 1 illustrates a flowchart of an exemplary process of sharing a secret between an isolated device and a network connected user device, according to some embodiments of the present invention. An exemplary process 100 may be executed by an isolated device and a network connected user device both associated with the same for sharing secret between them. In order to ensure security and privacy of the secret, the isolated device may generate a secret employ a split transfer of the secret to prevent the secret from being compromised by one or more malicious parties who may monitor communication between the isolated device and the network connected user device to in attempt to intercept transferred data and exploit it to recover the secret.

Figure 2:
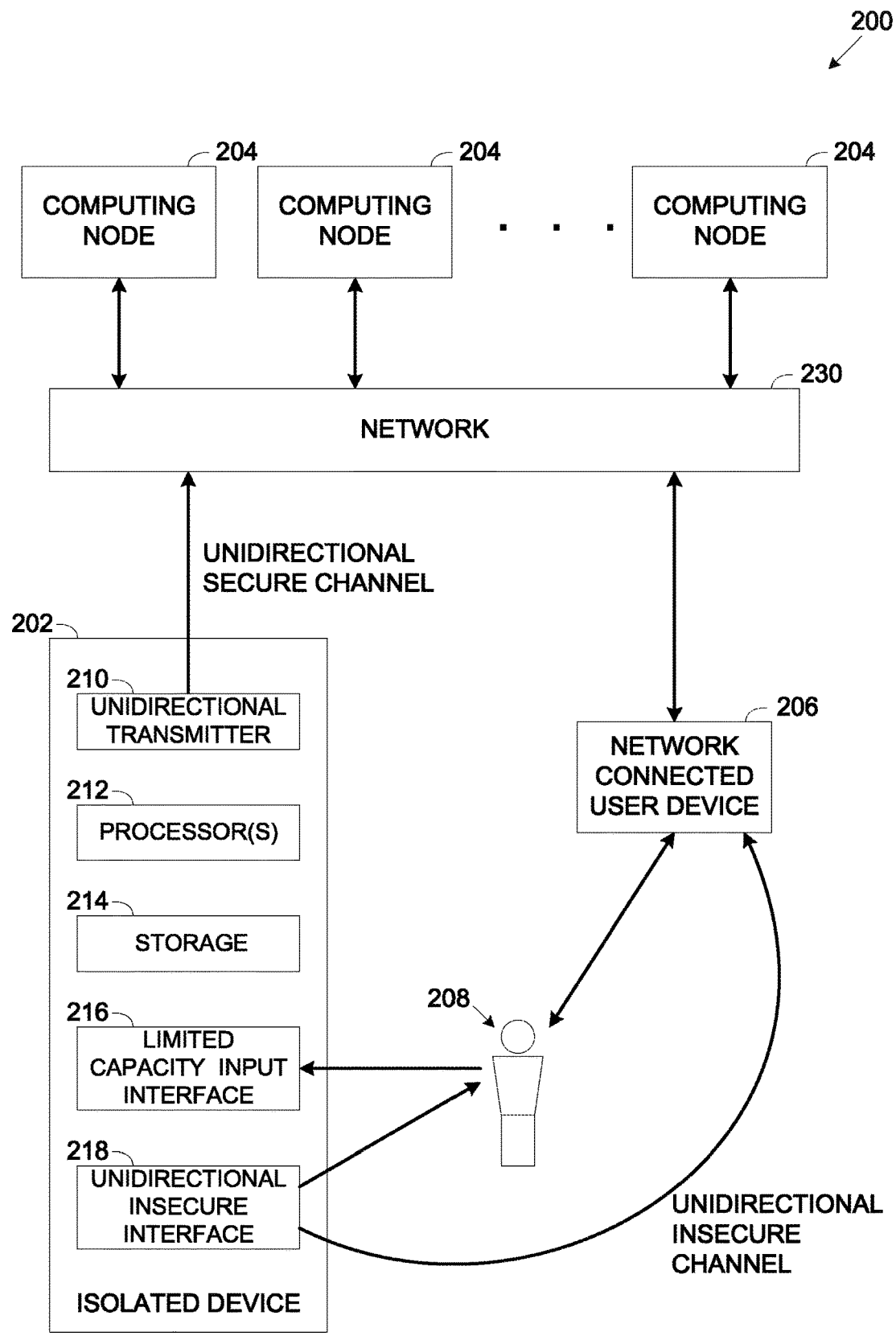
FIG. 2 is a schematic illustration of an exemplary system for sharing a secret between an isolated device and a network connected user device, according to some embodiments of the present invention.

Reference is also made to FIG. 2, which is a schematic illustration of an exemplary system for sharing a secret between an isolated device and a network connected user device, according to some embodiments of the present invention. An exemplary system 200 may include an isolated device 202 associated with a user 208 and adapted to communicate, via a network 230, with a distributed system comprising a plurality of computing nodes 204 providing one or more services to the isolated device 202 and/or the user 208.

The isolated device 202 may support a unidirectional transmit-only connection to the network 230 to establish a unidirectional (one-way) secure communication with one or more of the computing nodes 204. However, the isolated device 202 having no input (receive) channel is incapable of receiving data from the network 230 thus the isolated device 202 is isolated from the network 230 and thus highly immune to malicious network based attacks directed to compromise the isolated device 202. The isolated device may be therefore used to store sensitive, private and/or theft-prone data. For example, the isolated device 202 may facilitate a cold wallet associated with one or more accounts of the user 208 to store digital assets of the associated user 208. In such embodiments, the computing nodes 204 of the distributed system may serve as a blockchain network (community) for regulating the digital assets, for example, a cryptocurrency by maintaining a distributed blockchain ledger for tracking, logging and recording digital assets (e.g. cryptocurrency) transactions.

The computing nodes 204 may include for example, a computer, a server, a processing node, a network node, a cloud computing resource, a Smartphone, a tablet and/or the like capable of communicating with each other via the network 230 comprising one or more wired and/or wireless networks, for example, a Local area Network (LAN), a Wireless LAN (WLAN), a Wide Area Network (WAN), a Municipal Area Network (MAN), a cellular network, the internet and/or the like.

The isolated device 202 may comprise a unidirectional transmitter 210 to facilitate the unidirectional (one-way) secure channel with one or more other devices, a processor(s) 212 for executing a process such as the process 100 and storage 214 for storing program code (program store) and/or data.

The isolated device 202 may further include one or more unidirectional insecure interfaces 218, for example, a display, a screen, a projector, an audio output interface, a tactile interface, a printer and/or the like for transmitting (transferring) data to one or more other devices. While the data transmitted by the unidirectional insecure channel 218 is tamper-resistant and cannot be altered, this data may be monitored and intercepted by one or more parties, potentially malicious parties other than the target device(s) to which the transmission is directed.

The isolated device 202 may optionally include a limited capacity input interface 216 for receiving limited and typically very low volume data.

The unidirectional transmitter 210 may include one or more wired, wireless and/or optical transmitting interfaces adapted for data transmittal only and thus unable to receive data. The unidirectional transmitter 210 may be tamper-resistant such that altering data transmitted from the unidirectional transmitter 210 is impossible and/or detectable and reported. Moreover, the unidirectional transmitter 210 may transmit encrypted data thus forming a reliable and secure unidirectional (one-way) communication channel. The unidirectional transmitter 210 may include for example, a light based (e.g. infrared, laser, etc.) transmitter configured for optically encoding data. In particular, the unidirectional transmitter 210 may transmit a directed light pattern directed to a specific receiver which may not be intercepted by potentially (eavesdropping) malicious devices. In another example, the unidirectional transmitter 210 may include a wired and/or wireless transmitter, for example, a serial transmitter, a Radio Frequency (RF) transmitter configured for transmitting data over wire and/or over the air.

The processor(s) 212, homogenous or heterogeneous, may include one or more processing nodes arranged for parallel processing, as clusters and/or as one or more multi core processor(s). The storage 214 may include one or more non-transitory memory devices, either persistent non-volatile devices, for example, a ROM, a Flash array, a hard drive, an SSD, a magnetic disk and/or the like and/or one or more volatile devices, for example, a RAM device, a cache memory and/or the like.

The unidirectional insecure interface(s) 218 may be typically used by the isolated device 202 to establish one or more unidirectional insecure channels for transmitting (transferring) data to nearby devices located at the same site and in close proximity to the isolated device 202. In particular the isolated device 202 may transfer data, via the unidirectional insecure channel, to a network connected user device 206 associated with the user 208 who may operate both the isolated device 202 and the network connected device 208. The data transmitted (transferred) via the unidirectional insecure channel is tamper-resistant, i.e. may not be altered. However, the transmitted data may be intercepted by and/or exposed to one or more parties monitoring the unidirectional insecure channel. The unidirectional insecure interface 218 may include, for example, a display, a screen, a projector and/or the like for displaying one or more strings, QR codes, barcodes, patterns and/or the like. In another example, the unidirectional insecure interface 218 may include an audio output interface which may transmit one or more audible outputs. In another example, the unidirectional insecure interface 218 may be implemented using a hardware storage media, for example, a CD-ROM disk and/or the like preferably a onetime use disposable disk. In such case, the unidirectional insecure interface 218 may include a media access interface adapted for writing, burning and/or programming data to the hardware storage media.

The limited capacity input interface 216 may be configured to receive limited and typically very low volume of data which may be manually and/or automatically inserted. For example, the limited capacity input interface 216 may include one or more HMIs such as, for example, a keyboard, a touchscreen, a touchpad and/or the like to enable the user to insert textual and/or numeral strings. In another example, the limited capacity input interface 216 may include a computer punched card reader configured to read data, for example, strings encoded in one or more punched cards inserted manually and/or automatically to the computer punched card reader.

The network connected user device 206, for example, a Smartphone, a tablet, a smart watch, smart glasses, a computer, a laptop, a server and/or the like which is associated with the user 208 may be used by the user to facilitate easy, simple and/or user friendly interaction with one or more of the computing node 204 providing the service(s) to the user 208. As such the network connected user device 206 may have network connectivity to the network 230 for transmitting and/or receiving data to and/or from the computing node(s) 204. Moreover, the network connected user device 206 may receive, via the network 230, data transmitted by the isolated device 202 via the unidirectional secure channel. The network connected user device 206 may further include one or more interfaces to receive data transmitted by the isolated device 202 via one or more of the unidirectional insecure channel(s) established by the isolated device 202 using the unidirectional insecure interface 218. For example, the network connected user device 206 may include a scanner to visually scan output generated by the isolated devices 202 and presented on the display of the isolated device 202. In another example, the network connected user device 206 may include a microphone to intercept audible outputs generated by the isolated devices 202 and delivered via the audio output (e.g. speaker) of the isolated device 202. In another example, the network connected user device 206 may include a reader, for example, a CD-ROM reader for reading hardware storage media, for example, a CD-ROM disk and/or the like generated by the isolated device 202.

The processor(s) 212 may execute one or more software modules such as, for example, a process, a script, an application, an agent, a utility, a tool and/or the like each comprising a plurality of program instructions stored in a non-transitory medium (program store) such as the storage 214 and executed by one or more processors such as the processor(s) 212. The isolated device 202 may further include one or more hardware elements, for example, a circuit, a component, an Integrated Circuit (IC), an Application Specific Integrated Circuit (ASIC), a Field Programmable Gate Array (FPGA), a Digital Signals Processor (DSP) and/or the like.

Using the processor(s) 212 and/or one or more of the hardware elements, the isolated device 202 may execute and/or implement one or more functional modules utilized via one or more software modules, hardware elements and/or a combination thereof. For example, the isolated device 202 may use a random number generator for creating one or more secret values, for example, a random string, a key, an encryption key, a decryption key, an encryption-decryption key pair (e.g. private and public key pair as known in the art) and/or the like. In another example, the isolated device 202 may use a Hardware Security Module (HSM) to utilize one or more functions, for example, public key infrastructures (PKIs), message signing, key injection, database encryption and/or the like.

The network connected user device 206 having one or more hardware elements, processors such as the processor(s) 212 and/or storage such as the storage 214 may also execute and/or implement one or more functional modules utilized via one or more software modules, hardware elements and/or a combination thereof.

As described herein before, the data transmitted by the isolated device 202 via the unidirectional secure communication channel facilitated by the unidirectional transmitter 210 may be encrypted. The encryption may be facilitated using one or more encryption schemes, for example, encryption-decryption key pairs uniquely associated with each of at least some of the computing nodes 204 to encrypt the data transmitted to the respective computing node 204 thus establishing a unidirectional secure and reliable channel with each of the at least some computing nodes 204. The isolated device 202 may also be associated with such an encryption-decryption key pair to support verification of data received by the isolated device 202 and authentication of data transmitted from the isolated device 202. In particular, the encryption-decryption key pairs associated with the computing nodes 204 may include, for example, an asymmetric cryptographic key pair comprising a private key and a public key and/or the like. The public key associated with each computing node 204 as well as with the public key associated with the isolated device 202 is publicly shared and thus serves as basis for the address of the respective device.

Moreover, the isolated device 202 may sign one or more messages transmitted via the unidirectional secure channel using its private key to enable one or more of the computing nodes 204, using the public key of the isolated device 202, to authenticate that the isolated device 202 is the originator of the message(s).

To facilitate the encrypted data transmission, the encryption (public) key of each of at least some of the computing nodes 204 must be available to the isolated device 202. Specifically, the isolated device 202 must obtain the encryption (public) key of each computing node 204 with which the isolated device communicates. In addition, in order to establish a unidirectional secure channel with the network connected user device 206 via the network 230, the isolated device 202 must obtain the encryption (public) key of the network connected user device 206. The encryption key(s) may be provided to the isolated device 202 using one or more techniques which are out of scope of the present invention.

The process 100 and the system 200 are described herein for a single isolated device 202 associated with a single user 208. However, this should not be construed as limiting since the process 100 and the system 200 may be expanded to support a plurality of isolated devices 202 associated with respective users 208.

As shown at 102, the process 100 starts with the isolated device 202 generating a secret, in particular a secret value, for example, a random string, a secret key and/or the like. For example, the isolated device 202 may use one or more hardware random number generators to generate the secret value. In another example, the isolated device 202 may apply one or more pseudo-random number generator algorithms to generate the secret value.

The isolated device 202 may further divide (split) the secret value to a plurality of components. For example, the isolated device 202 may divide the secret value to a first component and a second component.

As shown at 104, the isolated device 202 may securely transmit one of the components of the secret value, for example, the first component to one of the plurality of computing nodes 204 via the unidirectional secure channel. The computing node 204 which receives the first component may be designated receiving computing node 204 herein after.

As described herein before, in order to securely transmit the first component to the receiving computing node 204, the isolated device 202 may encrypt the first component using the encryption key associated with the receiving computing node 204. To this end the isolated device 202 may locally store one or more of a plurality of encryption keys each of a respective one of a plurality of encryption-decryption key pairs each uniquely associated with a respective one of the computing nodes 204 of the distributed system providing the service(s) to the isolated device 202 and/or to the user 208. Using the respective encryption key, for example, a public key of the receiving computing node 204, the isolated device 202 may encrypt the first component transmitted to the receiving computing node 204 thus ensuring security of the first component which may not be intercepted by a potentially malicious party monitoring traffic over the network 230.

Moreover, the isolated device 202 may sign the first component transmitted via the unidirectional secure channel using its own uniquely associated private key. The receiving computing node 204, using the public key of the isolated device 202, may thus authenticate that the isolated device 202 is the originator of the first component.

As shown at 106, the isolated device 202 may transmit (transfer) a complementary component of the secret value, i.e., the second component to the network connected user device 206 via the unidirectional insecure channel. For example, the isolated device 202 may generate a visually encoded version of the second component, for example, a QR code, a barcode and/or the like. The isolated device 202 may project the visually encoded version on the display of the display device incorporated in the unidirectional insecure interface 218. The network connected user device 206 may scan the display of the isolated device 202 to capture the visually encoded version and may analyze the visually encoded version to extract the second component. In another example, the isolated device 202 may generate an audible encoded version of the second component and operate the audio output incorporated in the unidirectional insecure interface 218 to sound the audible encoded version. The network connected user device 206 may intercept the audible encoded version and analyze may the audible encoded version to extract the second component. In another example, the isolated device 202 may generate store the second component on a hardware storage media, for example, a CD-ROM using the CD-ROM writer incorporated in the unidirectional insecure interface 218 to sound the audible encoded version. The CD-ROM may be provided to the network connected user device 206 which may read the contents of the CD-ROM to retrieve the second component.

As shown at 108, after receiving the second component from the isolated device 202, the network connected user device 206 may communicate with the receiving computing node 204 to request and obtain the first component.

In particular, in order to prevent interception of the first component by the malicious party(s), the network connected user device 206 communicates with the receiving computing node 204 via a secure channel established between the network connected user device 206 and the receiving computing node 204. The secure channel between the network connected user device 206 and the receiving computing node 204 may be established by encrypting the communication, specifically the first component using encryption-decryption keys of the receiving computing node 204 and the network connected user device 206 as described for the communication between the isolated 202 and the computing nodes 204. The network connected user device 206 may be also uniquely associated with an encryption-description key pair, for example, an asymmetric key pair comprising a private key and a public key. Using the public key of the receiving computing node 204 and its own private key, the network connected user device 206 may encrypt data transmitted to the receiving computing node 204. Similarly, using public key of the network connected user device 206 and its own private key, the receiving computing node 204 may encrypt data transmitted to the network connected user device 206. As the data is encrypted with the private keys of the respective devices (i.e. the network connected user device 206 and the receiving computing node 204) the messages origin may be authenticated.

To enable the network connected user device 206 to establish the secure channel with the receiving computing node 204, the isolated device 202 may transmit the public key of the receiving computing node 204 to the network connected user device 206. The isolated device 202 may transmit (transfer) the encryption key (e.g. public key) of the receiving computing node 204 to the network connected user device 206 via the unidirectional insecure channel. Since the encryption key (e.g. public key) of the receiving computing node 204 is already publicly shared there is no danger in transmitting it via the unidirectional insecure channel which may be monitored and/or exposed to the malicious party(s). Even if the malicious party(s) intercepts the public key of the receiving computing node 204, the malicious party(s) may not be exploited it or benefit from it as the public key is public knowledge.

When communicating with the receiving computing node 204, the network connected user device 206 may publish its own public key to the receiving computing node 204. This may allow establishing the secure channel between the between the network connected user device 206 and the receiving computing node 204.

The isolated device 202 may transmit the encryption key of the receiving computing node 204 to the network connected user device 206 in a separate transmission via the unidirectional insecure channel. For example, assuming the unidirectional insecure channel is facilitated by the display. The isolated device 202 may generate a visually encoded version (e.g. QR code) of the encryption key of the receiving computing node 204 and project it via the display of the isolated device 202. The network connected user device 206 may scan the display to capture the visually encoded version of the encryption key and may analyze the captured visually encoded version to extract the encryption key of the receiving computing node 204.

However, the isolated device 202 may combine the encryption key of the receiving computing node 204 with the second component and transmit them together to the network connected user device 206 in a single transmission via the unidirectional insecure channel. For example, assuming the unidirectional insecure channel is facilitated by the display. The isolated device 202 may generate a visually encoded element (e.g. QR code) encoding both the second component and the encryption key of the receiving computing node 204. The isolated device 202 may then project the combined visually encoded element via the display of the isolated device 202. The network connected user device 206 may scan the display to capture the combined visually encoded element may analyze it to extract both the second component and the encryption key of the receiving computing node 204.

The distributed system may serve a plurality of isolated devices such as the isolated device 202 and/or a plurality of secret sharing sessions initiated by one or more isolated devices 202. To differentiate between secret sharing sessions in which isolated device(s) 202 share secrets with respective network connected user device(s) 206, each secret sharing session may be assigned a unique identifier. The unique identifier of the secret sharing session thus associates each first component with a respective second component generated during the respective secret sharing session. The unique identifier may be, for example, a random value generated by the isolated device 202 and transmitted to both the receiving computing node 204 and to the network connected user device 206. The isolated device 202 may transmit the unique identifier to the receiving computing node 204 via the unidirectional secure channel typically together with the first component. The isolated device 202 may transmit the unique identifier to the network connected user device 206 via the unidirectional insecure channel either in a separate transmission or combined in a single transmission with the second component and optionally the public key of the receiving computing node 204 as described herein before for the public key of the receiving computing node 204.

When communicating with the receiving computing node 204, the network connected user device 206 may provide the unique identifier to the receiving computing node 204. The receiving computing node 204 may identify the first component corresponding to the specific secret sharing session according to the unique identifier received from the network connected user device 206 and may provide the identified corresponding first component to the network connected user device 206.

The unidirectional insecure channel may be monitored and/or exposed to the malicious party(s) who may intercept the second component of the secret value, the public key of the receiving computing node 204 and the unique identifier. The malicious party(s) may therefore communicate with the receiving computing node 204 and may attempt, using the intercepted data, to obtain the first component from the receiving computing node 204.

In order to prevent such exploitation by the malicious party(s), the receiving computing node 204 may be configured to respond only to a first request to obtain the first component and decline any subsequent requests for each secret sharing session identified by its unique session identifier.

In case the first request for the first component is genuinely received from the network connected user device 206, the receiving computing node 204 provides the first component to the network connected user device 206. In case the first request for the first component is received from a malicious party impersonating as the network connected user device 206, the receiving computing node 204 may provide the first component to the malicious party. However, after the malicious party obtained the first request, when the network connected user device 206 requests the first component, the receiving computing node 204 declines the request of the network connected user device 206. At this point the receiving computing node 204 may determine that the secret sharing session is compromised and may abort. Moreover, the receiving computing node 204 may respond to the network connected user device 206 with a failure indication to inform the network connected user device 206 of the compromised secret sharing session.

Optionally, the receiving computing node 204 is configured to respond to the request for the first component within a predefined time period, for example, 30 second, a minute and/or the like to limit the time duration of the secret sharing session. This may be done to further reduce probability for the malicious party(s) to launch one or more attack vectors, for example, man in the middle in attempt to impersonate as the network connected device 206 and obtain the first component in order to reproduce the secret value.

As shown at 110, in case the network connected user device 206 successfully obtains the first component, the network connected user device 206 may combine the first and second components to reproduce the secret value. The secret value is thus shared between the isolated device 202 and the network connected user device 206.

In case of a potential compromised secret sharing session, in response to the received failure indication, the network connected user device 206 may generate an indication, for example, a failure message presented to the user 208 to inform the user 208 of the failed (compromised) secret sharing session.

After receiving the failure indication, the user 208 may inform the isolated device 202 of the failed secret sharing session to inform which may be compromised by the malicious(s) party. For example, the user 208 may operate the limited capacity input interface 216 to insert a key, symbol and/or limited length string predefined to indicate failure. In another example, the network connected user device 206 may generate a limited length string encoding the failure indication received from the receiving computing node 204. The network connected user device 206 may further encode the session identifier of the failed session such that the isolated device 202 may identify the exact secret value which may be compromised.

Based on the received failure indication, the isolated device 202 may invalidate the secret sharing session and may discard the secret value generated in the invalid session which are determined unsafe and may not be used. Optionally, the isolated device 202 may initiate another secret sharing session and repeat the process 100 to share a newly generated secret value with the network connected user device 206.

As shown at 112, which is an optional step, after the network connected user device 206 reproduces the secret value the isolated device 202 may verify that the secret value is correctly shared with the network connected user device 206. In particular, the correct sharing of the secret value may be verified in case the network connected user device 206 successfully obtains the first component of the secret value and no failure indication is received for the secret sharing session form the receiving computing node 204. Moreover, the verification is based on physically operating the isolated device 202 which is naturally done by the user 208. In case another and potentially malicious person attempts to operate the isolated device he may be easily noticed by the user 208 who is physically located next to the isolated device 202.

The network connected user device 206 may generate a limited length string based on the shared secret value according to one or more predefined methods, techniques and/or algorithms. For example, the network connected user device 206 may apply one or more manipulation functions (e.g. hash functions) to generate the limited length string based on the secret value and/or a derivation of the secret value.

The limited length string may be provided to the isolated device 202, for example, by the user 208 operating the limited capacity input interface 216. The isolated device 202 may analyze the received limited length string to verify that the secret value used by the network connected user device 206 to generate the limited length string is indeed the secret value generated by the isolated device 202.

Optionally, the isolated device 202 verifies that the secret value is correctly shared with the network connected user device 206 based on a challenge transmitted to the network connected user device 206. This may be done to further increase certainty that the secret value is shared with the network connected user device 206 and not with the malicious party(s) impersonating as the network connected user device 206 using one or more attack vectors, for example, man in the middle.

The isolated device 202 may generate a challenge and may transmit it to the network connected user device 206 via the unidirectional insecure channel, for example, project a QR code on the display of the isolated device 202. In another example, the isolated device 202 may embed the challenge in the transmission of the second component via the unidirectional insecure channel, for example, the isolated device 202 may project a visually encoded element (e.g. QR code) encoding the second component, the challenge and optionally the encryption key of the receiving computing node 204. In another example, the challenge may be predefined and/or embedded in code executed by the network connected user device 206.

The network connected user device 206 may than generate a limited length string based on the shared secret value and the challenge according to one or more of the predefined methods, techniques and/or algorithms, for example, the hash function. The limited length string may be provided to the isolated device 202, for example, by the user 208 operating the limited capacity input interface 216. The isolated device 202 may then analyze the received limited length string to verify that the secret value and the challenge used by the network connected user device 206 to generate the limited length string are indeed the secret value and the challenge generated by the isolated device 202.

The secret shared between the isolated device 202 and the network connected user device 206 may be used for one or more of a plurality of applications.

For example, the isolated device 202 may share the secret value with the network connected user device 206 in order to generate an OTP which may be used by the user 208 for accessing the isolated device 202. This may be highly advantageous as the isolated device 202 may store sensitive, private and/or theft-prone data to which access is restricted to only the user 208. Therefore by sharing the secret value with the network connected user device 206 according to the process 100, the isolated device 202 may ensure that the network connected user device 206 is associated with the user 206 and may trust it for generating the OTP.

In another example, the isolated device 202 may share the secret value with the network connected user device 206 in order to generate an encryption-decryption key pair (e.g. private/public keys) uniquely associated with the network connected user device 206. The isolated device 202 may further publish the public key generated and associated with the network connected user device 206 to one or more of the computing nodes 204. As such the isolated device 202 publishes to the distributed system that the network connected user device 206 is associated with the isolated device 202 and may be trusted. The network connected user device 206 may thus communicate with one or more of the computing nodes 204 of the distributed system on behalf of the associated user 208. This may be highly beneficial since the user 208 may be extremely limited in communicating with the distributed system through the isolated device 202 which has only the limited capacity input interface 216. The trusted network connected user device 206 may be operated by the user 208 to interact with the distributed system.

In another example, the isolated device 202 may share the secret value with the network connected user device 206 in order to generate an encryption-decryption key pair (e.g. private/public keys) uniquely associated with the network connected user device 206. The isolated device 202 may use the encryption-decryption key pair to securely transmit data to the network connected user device 206 via the unidirectional secure channel and/or via the unidirectional insecure channel which is now made secure by use of the encryption-decryption key pair. In particular, the isolated device 202 may use the public key of the network connected user device 206 to encrypt data messages transmitted to the network connected user device 206. The isolated device 202 may further sign these messages using its own private key to enable the network connected user device 206 to authenticate the isolated device 202 as the originator using the public key of the isolated device 202 which may be delivered to the network connected user device 206 via the unidirectional insecure channel.

Using the secure channel to communicate over the network 230 with the network connected user device 206 may present major advantages as the isolated device 202 may need to transfer large amounts of data which to the network connected user device 206 which may difficult and time and/or effort consuming using the unidirectional insecure channel (e.g. QR codes, barcodes, etc.). In addition, using the encryption-decryption key pair for transferring data via the unidirectional insecure channel makes the unidirectional insecure channel secure and immune to interception by the malicious party(s).

According to some embodiments of the present invention, the isolated device 202 transmits a plurality of first components to a plurality of computing nodes 204 of the distributed system which following the terminology defined herein before may be designated receiving computing nodes 204. Such implementations may be applied, for example, in the distributed system facilitating the cryptocurrency community network where at least some of the plurality of receiving computing nodes 204 may serve as a plurality of hot wallets.

In a first exemplary implementation of multiple first components, the isolated device 202 may divide the generated secret value to a set of first components and a second component as described in step 102 for a single first component. The isolated device 202 may transmit the set of first components to a subset of receiving computing nodes 204 of the distributed system using the unidirectional secure channel established with each of the receiving computing nodes 204 as described in step 104 for a single receiving computing node 204. For example, the isolated device 202 may encrypt each first component of the set using the public key of a respective one of the receiving computing nodes 204 such that each respective first component may be decrypted and read only by the respective receiving computing node 204 having the private key corresponding to the public key used to encrypt the respective first key.

The isolated device may further transfer (transmit) the second component to the network connected user device 206 as described in step 106. The network connected user device 206 may communicate with each of the plurality of receiving computing nodes 204 to obtain the set of first components as described in step 108 for a single receiving computing node 204. In case one or more of the receiving computing nodes 204 receives more than a single request for its respective first component, the receiving computing node(s) 204 may determine that the secret sharing session is compromised and may respond accordingly as described in step 108. Assuming the secret sharing session is not compromised and the first components of the set are successfully obtained, the network connected user device 206 may reproduce the secret value by combining the set of first components and the second component as described in step 110 for a single first component.

In a second exemplary implementation of multiple first components, the isolated device 202 may divide the secret value to the first and second components. The isolated device 202 may further divide (split) the first component to a plurality of first components according to one or more secret sharing algorithm, for example, Shamir Secret sharing and/or the like. In particular, the isolated device 202 divides the first component to a plurality of first components using the secret sharing algorithm(s) applied according to one or more configuration parameter.

The configuration parameter may define, for example, configuration of the secret sharing algorithm(s) to set a count of first components required to be combined with the second component to reproduce the secret value. For example, a certain configuration parameter may dictate that the 4 first components out of a set of 6 first components created using the secret sharing algorithm(s) may be sufficient to recover the first component which may be combined with the second component to reproduce the secret value. In another example, multiple secret sharing algorithms may be concatenated to apply the secret sharing to groups of first components, for example, three groups each comprising 10 first components. In such case a certain configuration parameter may dictate that the first component of the secret value may be recovered using at least 7 first components out of at least two of the three groups. The recovered first component may be then combined with the second component to reproduce the secret value.

The isolated device 202 may transmit the first components to a subset of receiving computing nodes 204 of the distributed system using the unidirectional secure channel established with each of the receiving computing nodes 204 as described in step 104 for a single receiving computing node 204.

The isolated device may further transfer (transmit) the second component to the network connected user device 206 as described in step 106. The network connected user device 206 may communicate with at least some of the plurality of receiving computing nodes 204 to obtain a sufficient number of first components as defined by the configuration parameter(s) applied to the secret sharing algorithm(s). In case one or more of the receiving computing nodes 204 receives more than a single request for its respective first component, the receiving computing node(s) 204 may determine that the secret sharing session is compromised and may respond accordingly as described in step 108. Assuming the secret sharing session is not compromised and the network connected user device 206 successfully obtains the sufficient number of first components, the network connected user device 206 may recover the first component and may reproduce the secret value by combining the set of first components and the second component as described in step 110 for a single first component.

In a third exemplary implementation of multiple first components, the isolated device 202 may divide the generated secret value to a plurality of first components and a second component as described in step 102 for a single first component. The isolated device 202 may transmit the plurality of first components to a plurality of receiving computing nodes 204 of the distributed system using the unidirectional secure channel established with each of the receiving computing nodes 204 as described in step 104 for a single receiving computing node 204.

The network connected user device 206 may communicate with at least some of the plurality of receiving computing nodes 204 to obtain a subset of the plurality of first components. Assuming the secret sharing session is not compromised and the network connected user device 206 successfully obtains the subset of first components, the network connected user device 206 may reproduce the secret value by combining the subset of first components and the second component as described in step 110 for a single first component. The network connected user device 206 may further generate one or more limited length strings which indicate each one of the receiving computing nodes 204 from which the subset of first components was obtained.

The limited length string may be provided to the isolated device 202, for example, by the user 208 operating the limited length input interface 216. Since the isolated device 202 is aware of which first components are transmitted to which receiving computing nodes 204, the isolated device 202 may confirm validity of the subset of first components indicated in the limited length string generated by the network connected user device 206.

Optionally, when conducting the secret sharing session with multiple receiving computing nodes 204, the isolate device 202 may assign a different and unique session identifier for each of the plurality of receiving computing nodes 204. When transmitting the first components to the receiving computing nodes 204, the isolated device 202 may further transmit a respective session identifier to each of the receiving computing nodes 204. The isolated device 202 transfers the plurality of session identifiers to the network connected user device 206 which may use the session identifier assigned to each of the receiving computing nodes 204 when communicating with the receiving computing nodes 204 to obtain the corresponding first components. Each of the receiving computing nodes 204 may thus correlate the request received from the network connected user device 206 with the corresponding first component.

The isolated device may apply one or more techniques, methods and/or algorithms for generating the plurality of session identifiers each for a respective one of the plurality of receiving computing nodes 204. For example, the isolated device 202 may generate a random basic session identifier and apply one or more functions, for example, a hash function to the basic session identifier in combination with the public key of each of the receiving computing nodes 204 thus producing a unique session identifier for each of the receiving computing nodes 204.

The isolated device 202 may transfer to the to the network connected user device 206 all the session identifiers assign to the plurality of receiving computing nodes 204. However, the isolated device 202 may optionally transfer only the basic session identifier to the network connected user device 206. The network connected user device 206 may derive the session identifiers assign to the plurality of receiving computing nodes 204 from the basic session identifier by applying the same function(s), for example, the same hash function used by isolated device 202 to generate the unique session identifiers generated for and transmitted to the receiving computing nodes 204.

Assigning the unique session identifiers to each of the plurality of receiving computing nodes 204 may be done to prevent one or more receiving computing nodes 204 which may potentially be malicious and/or compromised receiving computing nodes from obtaining the plurality of first components from the other receiving computing nodes 204. In case a single common session identifier is used for the plurality of receiving computing nodes 204, each receiving computing node 204 may access the other receiving computing nodes 204 and using the common session identifier may obtain the respective first components from at least some of the receiving computing nodes 204. Since the malicious party may intercept the second component transferred from the isolated device 202 to the network connected user device 206, the malicious party having the first components and the second component may reproduce the secret value. Therefore by assigning the unique session identifier to each of the receiving computing nodes 204, no single receiving computing node 204 may be able to obtain the first components from the other receiving computing nodes 204 in attempt to compromise the secret value.

Figure 3:
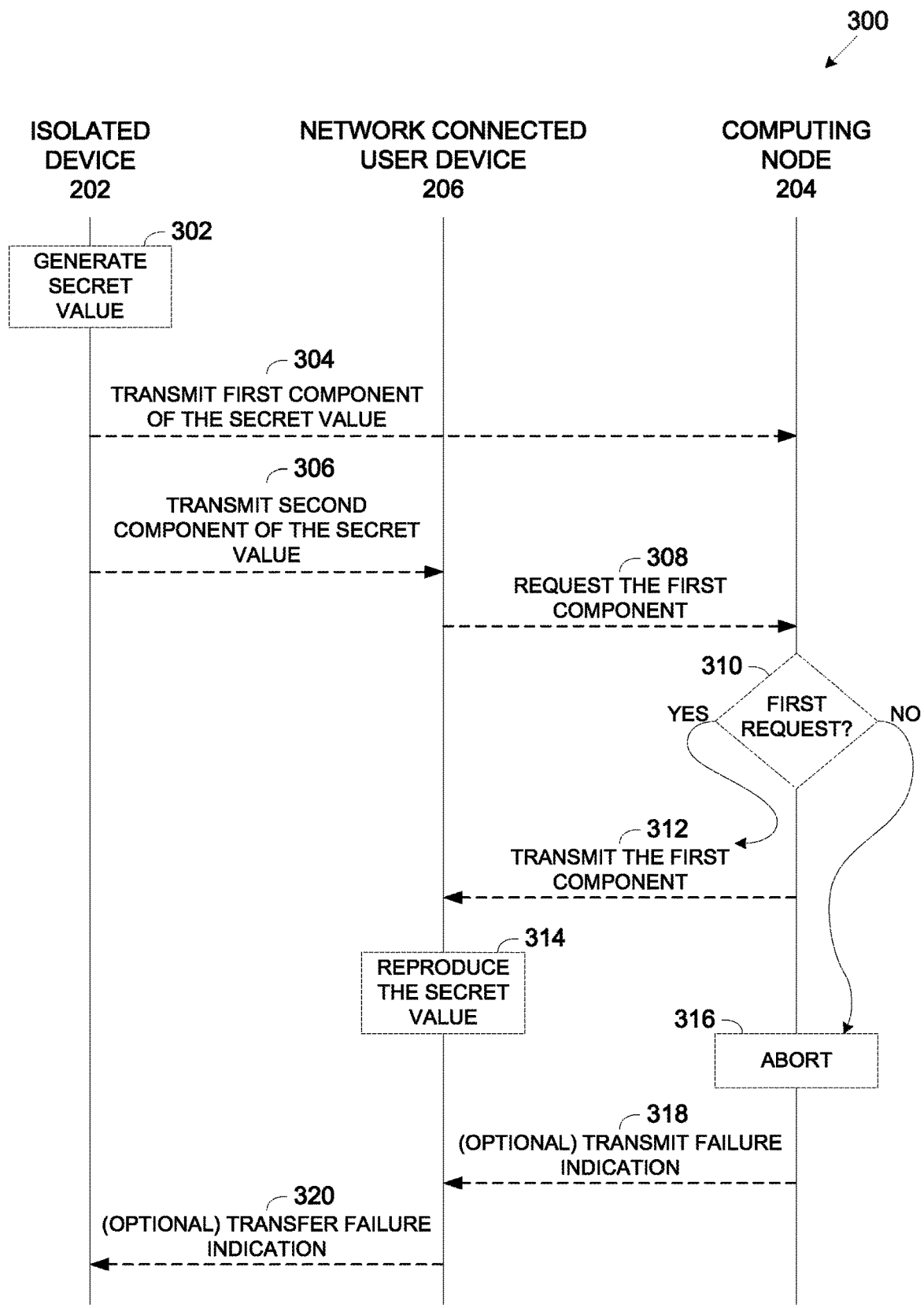
FIG. 3 is a schematic illustration of an exemplary sequence of sharing a secret between an isolated device and a network connected user device, according to some embodiments of the present invention.

Reference is now made to FIG. 3, which is a schematic illustration of an exemplary sequence of sharing a secret between an isolated device and a network connected user device, according to some embodiments of the present invention. An exemplary sequence 300 described a secret sharing session executed for sharing a secret between an isolated device such as the isolated device 202 and a network connected user device such as the network connected user device 206 both associated with a user such as the user 208 served by a distributed system comprising a plurality of computing nodes such as the computing node 204.

The isolated device 202 may generate 302 a secret value and may further divide the secret value to a first component and a second component as described in step 102 of the process 100.

The isolated device 202 may transmit 304 the first component of the secret value to one or more of the computing nodes 204 designated receiving computing node(s) 204 via the unidirectional secure channel as described in step 104 of the process 100. For brevity, the sequence 300 is described for a single receiving computing node 204. As described in the process 100, the isolated device 202 may further transmit the session identifier of the secret sharing session to the receiving computing node 204 to associate the first component with the specific secret sharing sessions and in particular with the respective second component.

The isolated device 202 may transfer (transmit) 306 the second component of the secret value to the network connected user device 206 via the unidirectional insecure channel as described in step 106 of the process 100. As described in the process 100, the isolated device 202 may further transmit the session identifier of the secret sharing session to the network connected user device 206 to associate the second component with the specific secret sharing sessions and in particular with the respective first component. Moreover, as described in the process 100, the isolated device 202 may transmit the public key of the receiving computing node 204 to the network connected user device 206 to enable the network connected user device 206 to establish communication with the receiving computing node 204.

The network connected user device 206 may communicate with the receiving computing node 204 to request 308 the first component as described in step 108 of the process 100. The network connected user device 206 may communicate with the receiving computing node 204 using the public key of the receiving computing node 204 received from the isolated device 202 via the unidirectional insecure channel. Moreover, the network connected user device 206 may provide its own public key to the receiving computing node 204 such that the receiving computing node 204 and the network connected user device 206 may encrypt and sign their transmitted messages using their respective private keys and shared public keys thus establishing a secure channel with each other.

The receiving computing node 204 may configured to respond to only the first request for the first component of the secret value may determine 310 whether the request received from the network connected user device 206 is the first request as described in step 108 of the process 100. In case the request of the network connected user device 206 is the first received at the receiving computing node 204, the receiving computing node 204 may transmit 312 the first component of the secret value to the network connected user device 206.

After successfully obtaining the first component, the network connected user device 206 may reproduce 314 the secret value by combining the first and second components as described in step 110 of the process 100.

However, in case the request of the network connected user device 206 for the first component is not the first received at the receiving computing node 204, the receiving computing node 204 may abort 316 the secret sharing session. The receiving computing node 204 may further transmit 318 to the network connected user device 206 a failure indication indicating failure of the secret sharing session as described in step 108 of the process 100.

In response to reception of the failure indication, the network connected user device 206 may generate an indication, for example, a message, a limited length string and/or the like to inform the user 208 of the failed secret sharing session. The user 208 may further transfer 320 a failure indication to the isolated device 202 as described in step 108 of the process 100, for example, by operating the limited capacity input interface 316.

It is expected that during the life of a patent maturing from this application many relevant systems, methods and computer programs will be developed and the scope of the terms secure channel, insecure channel and blockchain is intended to include all such new technologies a priori.

The terms "comprises", "comprising", "includes", "including", "having" and their conjugates mean "including but not limited to".

The term "consisting of" means "including and limited to".

As used herein, the singular form "a", "an" and "the" include plural references unless the context clearly dictates otherwise. For example, the term "a compound" or "at least one compound" may include a plurality of compounds, including mixtures thereof.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the embodiments described herein have been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the embodiments described herein. To the extent that section headings are used, they should not be construed as necessarily limiting. In addition, any priority document(s) of this application is/are hereby incorporated herein by reference in its/their entirety.

What is claimed is:

1. A method of sharing a secret between an isolated device connected to a network through a transmit-only unidirectional secure channel and a network connected user device, comprising:
   using at least one processor of the isolated device associated with a user for:
      generating a secret value divided to first and second components;
      transmitting the first component, via the unidirectional secure channel, to at least one computing node of a distributed system; and
      transferring the second component, via a tamper-resistant unidirectional insecure channel, to the network connected user device associated with the user, the network connected user device reproduces the secret value by combining the first component received from the at least one computing node with the second component
   wherein the at least one computing node provides the first component in response to a first request to obtain the first component and declines any successive request to obtain the first component;
   wherein in case the network connected user device fails to obtain the first component due to a previous request for the first component received by the at least one computing node, the network connected user device generates a failure indication, in response to the failure indication the user informs the isolated device of the failure.

2. The method of claim 1, further comprising verifying the secret value is correctly shared with the network connected user device by analyzing a limited length string generated by the network connected user device based on the secret value.

3. The method of claim 2, wherein the limited length string is received from the user operating a limited capacity input interface of the isolated device.

4. The method of claim 2, further comprising verifying the secret value is correctly shared with the network user connected device based on a challenge by:
   transferring the challenge to the network connected user device via the unidirectional insecure channel,
   receiving, from the user, a limited length string generated by the network connected user device based on the challenge and the secret value, and
   verifying correctness of the secret value by analyzing the received limited length string.

5. The method of claim 1, wherein the distributed system comprises a plurality of computing nodes providing at least one service to the isolated device, the isolated device locally stores a plurality of encryption keys each of a respective one of a plurality of encryption-decryption key pairs each uniquely associated with a respective one of the plurality of computing nodes.

6. The method of claim 5, wherein the unidirectional secure channel established with the at least one computing node is secured by encrypting communication transmitted from the isolated device using the encryption key of the respective encryption-decryption key pair uniquely associated with the at least one computing node.

7. The method of claim 1, wherein the unidirectional insecure channel is a display of the isolated device, transferring the second component to the network connected user device via the unidirectional insecure channel comprises projecting a visually encoded version of the second component via the display which is scanned by the network connected device.

8. The method of claim 1, wherein the network connected user device receives the first component via a secure connection established with the at least one computing node by encrypting communication transmitted between the network connected user device and the at least one computing node using respective encryption keys of respective encryption-decryption key pairs uniquely associated with the network connected user device and with the at least one computing node.

9. The method of claim 8, wherein the isolated device transfers the respective encryption key of the at least one computing node to the network connected user device via a tamper-resistant unidirectional insecure channel.

10. The method of claim 8, further comprising signing the first component transmitted to the at least one computing node to enable the network connected user device to authenticate that the first component received from the at least one computing node genuinely originates from the isolated device.

11. The method of claim 1, wherein a unique identifier associating the first component with the second component is transferred by the isolated device to the at least one computing node and to the network connected user device, the network connected user device uses the unique identifier to identify, to the at least one computing node, the requested first component associated with the second component.

12. The method of claim 1, further comprising transmitting a plurality of first components of the secret value to a group of computing nodes of the distributed system, the network connected user device communicates with each computing node of the group to receive the plurality of first components, the network connected user device reproduces the secret value by combining the plurality of first components with the second component.

13. The method of claim 1, further comprising splitting the first component to a plurality of first components using at least one secret sharing algorithm applied according to at least one configuration parameter and transmitting the plurality of first components to a group of computing nodes of the distributed system, the network connected user device reproduces the secret value by combining a subset of the plurality of first components with the second component, the subset of first components is received from a sufficient number of computing nodes defined by the at least one configuration parameter.

14. The method of claim 1, further comprising transmitting a plurality of first components to a plurality of computing nodes of the distributed system, the network connected user device reproduces the secret value by combining a subset of the plurality of first components with the second component, the network connected user device generates a limited length string indicative of the subset, the a limited length string is provided to the isolated device to enable the isolated device to confirm validity of the first components received by the network connected user device from the subset of computing nodes.

15. The method of claim 1, wherein the secret value is shared with the network connected user device to create a One-Time Password (OTP) used by the user to access the isolated device.

16. The method of claim 1, wherein the secret value shared with the network connected user device is an encryption-decryption key pair uniquely associated with the network connected user device to associate the network connected user device with the isolated device and the user, the network connected user device uses the encryption-decryption key pair to securely communicate on behalf of the associated user with the at least one computing node to which the decryption key of the encryption-decryption key pair is published.

17. The method of claim 1, wherein the secret value shared with the network connected user device is an encryption-decryption key pair uniquely associated with the network connected user device to associate the network connected user device with the isolated device and the user, the isolated device uses a decryption key of the encryption-decryption key pair to securely transmit data to the network connected user device, the isolated device securely transmits the data to the network connected user device via at least one of: the unidirectional secure channel and the tamper-resistant unidirectional insecure channel which is made secure by use of the encryption-decryption key pair.

18. The method of claim 1, wherein the at least one computing node provides the first component in response to the first request made within a predefined time period from the time of receiving the first component from the isolated device.

19. An isolated device, comprising:
a transmit-only first interface, adapted to transmit data via a unidirectional secure channel;
a transmit only second interface adapted to transmit data via a tamper-resistant unidirectional insecure channel; and
at least one processor coupled to the first and second interfaces, the at least one processor is adapted to execute a code, the code comprising:
code instructions to generate a secret value divided to first and second components,
code instructions to transmit the first component, via the unidirectional secure channel, to at least one computing node of a distributed system, and
code instructions to transfer the second component, via the tamper-resistant unidirectional insecure channel, to the network connected user device associated with the user, the network connected user device reproduces the secret value by combining the first component received from the at least one computing node with the second component;
wherein the at least one computing node provides the first component in response to a first request to obtain the first component and declines any successive request to obtain the first component;
wherein in case the network connected user device fails to obtain the first component due to a previous request for the first component received by the at least one computing node, the network connected user device generates a failure indication, in response to the failure indication the user informs the isolated device of the failure.

20. The isolated device of claim 19, further comprising a third interface adapted to receive limited length strings, the code further comprising code instructions to verify the secret value is correctly shared with the network connected user device by analyzing a limited length string generated by the network connected user device based on the secret value.

* * * * *